June 24, 1930.  E. T. MEAKIN  1,766,033

APPARATUS FOR PROCESSING ANIMAL MATTER

Filed Feb. 18, 1924  2 Sheets-Sheet 1

INVENTOR
Edgar T. Meakin.
By White Prost + Evans
his Attorney

June 24, 1930.   E. T. MEAKIN   1,766,033
APPARATUS FOR PROCESSING ANIMAL MATTER
Filed Feb. 18, 1924   2 Sheets-Sheet 2

Inventor
Edgar T. Meakin
By White Prost & Evans
his Attorney

Patented June 24, 1930

1,766,033

UNITED STATES PATENT OFFICE

EDGAR T. MEAKIN, OF BERKELEY, CALIFORNIA

APPARATUS FOR PROCESSING ANIMAL MATTER

Application filed February 18, 1924. Serial No. 693,582.

My invention relates broadly to apparatus for processing animal or fish material in the production of oil, lard, tallow, tankage, fertilizer, cracklings, stock and poultry food and similar packing house and cannery by-products, and particularly to apparatus for the production of lard and cracklings for human consumption.

The broad object of my invention is the provision of an apparatus wherein the manufacture of the above named products may be continuously and economically carried on.

Another object of the invention is the provision of an apparatus wherein a thorough cooking of the material is effected at a relatively low temperature and in vacuo, thereby liberating substantially all the water and breaking up the fat cells so that much of the oil content is freed in the cooking chamber and the remainder is readily extracted in the press. This process forms the subject matter of my copending application Serial Number 693,581..

Still another object is the provision of an apparatus wherein the aforesaid processes may be carried out in from one-third to one-fourth the length of time heretofore required for the making of an inferior product.

My invention possesses other objects and features of advantage, some of which, with the foregoing, will be set forth in the following description of the invention. It is to be understood that I do not limit myself to the showing made by the said description, as I may adopt variant forms of the invention within the scope of the claims.

Figure 1:
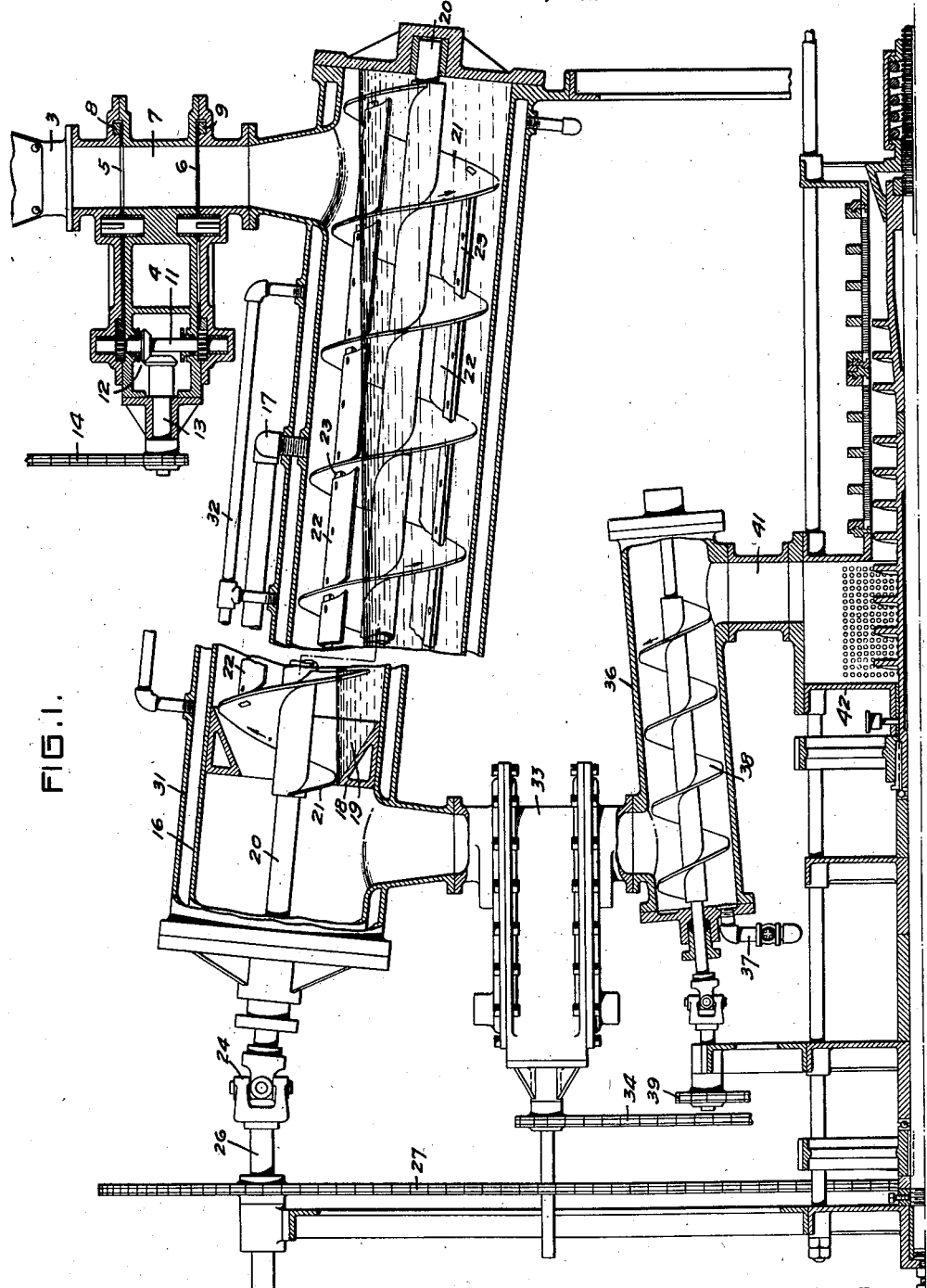
Figure 2:
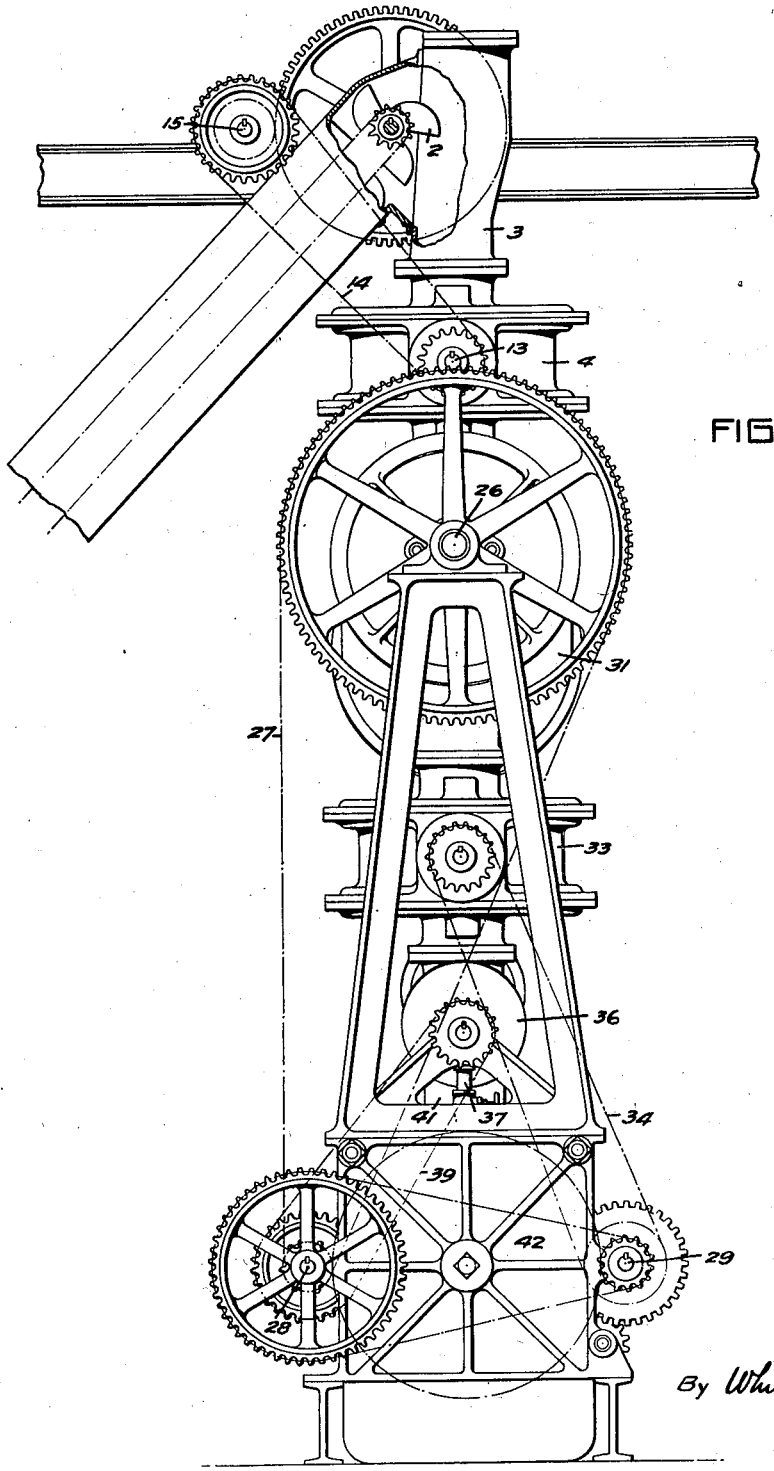

Referring to the drawings: Fig. 1 is a side elevation of the cooking and draining portion of my apparatus, most of the figures being shown in vertical section, and a portion thereof being displaced out of its true relationship to reduce the height of the figure. Fig. 2 is an end elevation of the apparatus, the direction of the view being from a point at the left of Fig. 1.

In terms of broad inclusion, my invention comprises an apparatus for the reduction of animal material such as fat, by cooking the fat in deep grease in a vacuum at as low a temperature as possible to secure the results, beginning the processing before the material has had a chance to deteriorate, and continuing it to completion as rapidly as the material will react. After thoro cooking the material is pressed and if desired, the solid residue may be ground. Thus cooked, a material substantially free from water is delivered to the press. Because of the fact that decomposition is avoided, practically no free fatty acids are present, and because of constant agitation in a relatively large volume of grease during the cooking the fat is thoroly and evenly acted upon by the hot grease and quickly broken up. Under the processes heretofore practiced which consumes from 4 to 6 hours much of the nitrogen compounds are lost, values as high as 15% being found in solution in the liquids extracted from the steam cooked material. Ammonia too is liberated from the wet, partially decomposed material at the relatively high temperature at which the cooking is carried on. In my process the cooking of the fresh fats is carried on in grease previously rendered from the same character of fat, and at temperatures usually below 150° F. There is therefore no opportunity for the loss of any constituent by aqueous solution, and the generation of ammonia is practically avoided. The entire process occupies from 2 to 4 hours. This means of course that the extracted oil or grease is of highest quality, almost free from fatty acids and having splendid keeping qualities. The residue is a valuable stock food or fertilizer, as the case may be, rich in nitrogen and free from offensiveness. If the proper selection of materials is made in the first instance, as for example pork fats, a lard of highest grade, and cracklings of appetizing flavor and appearance and high nutritive value as a human food are obtained.

Heretofore the best grade of lard was composed of the so-called "leaf" and not over 15% of selected cutting fats. The rest of the cutting fats, and the killing fats were steam treated to secure the cheaper grades of lard. The residue has been used for animal food, or fertilizer. Used as feed, it is necessary to starve the stock into eating it, as it is more or less rancid and offensive.

With my process I am enabled to use all of the pork fats without selection and produce from them a lard of the highest quality, with a residue forming a valuable human food, particularly suitable as a filler for sausage, instead of the commonly used cereal fillers. So used the sausage is improved in keeping qualities, flavor, firmness and food value.

Because my process eliminates pressing the cooked material in blankets, and also evaporation to recover solids in solution and suspension which may amount to 15%, it is a much shorter process than the one now in general use. Processing begins with the first accession of the material, the work of reduction keeping pace with such production so that no accumulation of material occurs. Within an hour or two after the last material has entered the cooker, the processing is completed. Materials so handled retain all of their values in products of measurably higher quality than any hitherto produced.

Considering my invention in detail and with special reference to the handling of pork fats, the killing and cutting fats are removed from the carcasses, preferably cut up or shredded and placed on a conveyor 2, which carries the material to a hopper 3, which discharges into a feed valve comprising a feed chamber 7 controlled by inlet and outlet plate valves 5 and 6 respectively. Each of these valves is provided with an annular aperture extending radially across the passage 7. Both plate valves are mounted for rotation about a common axis, and at their peripheries are provided with ring gears 8 and 9 respectively in mesh with pinions on the shaft 11, driven thru suitable gearing 12, by the shaft 13 which is connected by the chain 14 with any suitable source of power such as the drive shaft 15 for the conveyor 2. The position of the apertures in the valve plates 5 and 6 are such that only one of the apertures is open at a time, that is to say, while the aperture in the inlet valve 5 is in such position as to permit the flow of material into the chamber 4, the outlet valve 6 closes the bottom of the chamber; and shortly after the inlet valve closes the outlet valve starts to open. The apertures in the valve plates extend annularly so that ample opportunity is given for material to enter the feed chamber and discharge therefrom with a continuous rotation of the valve plates, but at the same time such apertures are restricted so that no lapping can occur to destroy the vacuum maintained in the cooking chamber into which the feed valve discharges.

The cooking chamber comprises an inner cylindrical shell 16, into which material is fed and which is vacuumized by suitable connection, thru the conduit 17, with vacuum apparatus of any desired type. The shell is set at a slight slant, the feed valve being at the low end. Adjacent the upper end is an annular ring 18, which forms a dam for the retention of a quantity of grease 19 at a substantially constant level. Because of the downward slant of the shell or cooking drum the greatest depth and volume of grease is found under the feed valve, so that incoming cold material is at once immersed in the grease with a minimum cooling effect thereon, and with a thoro and even application of the hot grease to each piece of fat. As the fat passes thru the cooking chamber it loses steadily in volume so that progressively less grease is required to keep it immersed or float it. Thus by inclining the bottom of the cooking chamber and using a dam at the high end, I am able to reduce to the minimum the quantity of grease or cooking liquid required. The length of the shell is such that the material is thoroly acted upon or cooked during its steady progress thru the cooking chamber, it being remembered that my process is a continuous one.

A shaft 20 is journaled in the heads of the inner shell, and has mounted thereon a helical blade 21 forming a screw conveyor for carrying the material thru the cooking chamber at an even speed in from 2 to 4 hours. In order to prevent accumulations on the inner surface of the cooking chamber and to agitate the cooking fat so that all particles are acted upon evenly by the grease, thin scraper blades 22 resiliently engaging the surface of the shell are mounted on the diametrically disposed bars 23 extending lengthwise of and secured to the screw.

The shaft 20 is connected thru the universal joint 24 to the shaft 26 driven by the chain 27 from the shaft 28 which receives its motion from the power shaft 29.

Surrounding the inner shell 16 is an outer shell 31 between which and the inner shell is a steam space supplied with steam under pressure thru the pipe 32 from any suitable boiler. The cooker therefore comprises a steam heated chamber in which the steam does not come in contact with the material undergoing treatment, and in which a high degree of vacuum, preferably about 24", is maintained substantially unchanged. I prefer to maintain a temperature in the cooking drum of about 135° F.

Under the high end of the cooking drum is the discharge valve 33, in all respects similar to the feed valve and the plate valves of which are driven by the chain 34 from the power shaft 29. Below the discharge valve is the inclined drainage drum 36, into the low end of which the discharge valve empties and which is provided at the low end with the drain pipe 37 for carrying off the free liquid to suitable storage receptacles.

It should be noted that the material discharged into the drainage drum is substantially free of water, containing not more than 6% of water by weight. The original water content for the most part is evaporated and drawn off by the vacuum pump during the cooking of the material, while the constant agitation in the hot grease has also broken up the material and insured an even cooking.

Arranged in the drainage chamber is a feed screw 38 driven by the chain 39 from the power shaft and adapted to carry the cooked fats slowly toward the upper end of the drainage drum, the free liquids meanwhile running back into the drain pipe. From the top of the drainage drum the material falls thru the passage 41 into the press 42, which may be of any desired type, preferably that shown in my copending application Serial Number 693,580 and in which the material loses nearly all of its remaining oil, the residue comprising cracklings forming a valuable and wholesome food rich in protein.

In order to start operations I charge into the cooking drum a quantity of lard previously made from fat of similar character. With the accession of the raw fat, the level of the hot grease quickly rises to the level maintained by the dam, and thereafter remains constant, the surplus passing over the dam and thru the discharge valve into the drainage chamber and drain pipe.

The high quality of the product which I am able to attain is believed to be largely due to the fact that the fat is evenly and thoroly cooked at a relatively low temperature and in its own grease, so that the water is evaporated and the cells broken up without a possibility of deterioration from decomposition or by burning or overheating.

I claim:

1. In an apparatus for extracting grease from grease bearing material, a cooking receptacle positioned with its bottom inclined, means for vacuumizing the receptacle, means for heating the receptacle, a feed chamber communicating with the receptacle adjacent the lower end of its bottom, a discharge chamber communicating with the receptacle adjacent the upper end of its bottom, valve means in each of said chambers for respectively admitting material into the receptacle and discharging material therefrom while maintaining the vacuum therein, and means for moving material thru the receptacle.

2. In an apparatus for extracting grease from grease bearing material, a cooking receptacle positioned with its bottom inclined, means for vacuumizing the receptacle, means for heating the receptacle, a drainage chamber positioned with its bottom inclined, a feed chamber communicating with the receptacle adjacent the lower end of its bottom, a discharge chamber communicating with the receptacle adjacent the upper end of its bottom and with the drainage chamber adjacent the lower end of its bottom, valve means in each of the feed and discharge chambers for respectively admitting material into the receptacle and discharging material therefrom while maintaining the vacuum therein, means for moving material thru the receptacle, and means for moving material thru the drainage chamber.

3. In an apparatus for extracting grease from grease bearing material, a receptacle positioned with its bottom inclined, means for vacuumizing the receptacle, means for heating the receptacle, a drainage chamber positioned with its bottom inclined, a feed chamber communicating with the receptacle adjacent the lower end of its bottom, a discharge chamber communicating with the receptacle adjacent the upper end of its bottom and with the drainage chamber adjacent the lower end of its bottom, valve means in each of the feed and discharge chambers for respectively admitting material into the receptacle and discharging material therefrom while maintaining the vacuum therein, a screw conveyor for moving material thru the receptacle, and a screw conveyor for moving material thru the drainage chamber.

4. In an apparatus for extracting grease from grease bearing material, a receptacle positioned with its bottom inclined, means for vacuumizing the receptacle, means for heating the receptacle, a feed chamber communicating with the receptacle adjacent the lower end of its bottom, a discharge chamber communicating with the receptacle adjacent the upper end of its bottom, valve means in each of said chambers for respectively admitting material into the receptacle and discharging material therefrom while maintaining the vacuum therein, means for moving material thru the receptacle, and a dam in the receptacle adjacent the upper end of its bottom.

5. In an apparatus for extracting grease from grease bearing material, a receptacle positioned with its bottom inclined, means for vacuumizing the receptacle, means for heating the receptacle, a drainage chamber positioned with its bottom inclined, a feed chamber communicating with the receptacle adjacent the lower end of its bottom, a discharge chamber communicating with the receptacle adjacent the upper end of its bottom and with the drainage chamber adjacent the lower end of its bottom, valve means in each of the feed and discharge chambers for respectively admitting material into the receptacle and discharging material therefrom while maintaining the vacuum therein, means for moving material thru the receptacle, means for moving material thru the drainage chamber, and a dam in the receptacle adjacent the upper end of its bottom.

6. In an apparatus for extracting grease from grease bearing material, a cooking receptacle in which the grease is extracted, means for retaining extracted grease in the receptacle, means for vacuumizing the receptacle, means for heating the receptacle, a feed chamber communicating with the receptacle, a discharge chamber communicating with the receptacle, valve means in each of said chambers for respectively admitting material into the receptacle and discharging material therefrom while maintaining the vacuum therein, and means for moving material thru the receptacle.

7. In an apparatus for extracting grease from grease bearing material, a cooking receptacle in which the grease is extracted, means for retaining extracted grease in said receptacle and at a substantially constant level, means for vacuumizing the receptacle, means for heating the receptacle, a feed chamber communicating with the receptacle, a discharge chamber communicating with the receptacle, valve means in each of said chambers for respectively admitting material into the receptacle and discharging material therefrom while maintaining the vacuum therein, and means for moving material thru the receptacle.

In testimony whereof, I have hereunto set my hand.

EDGAR T. MEAKIN.